Oct. 21, 1924.
L. SCHMIDT
FAUCET
Filed Dec. 31, 1921
1,512,806
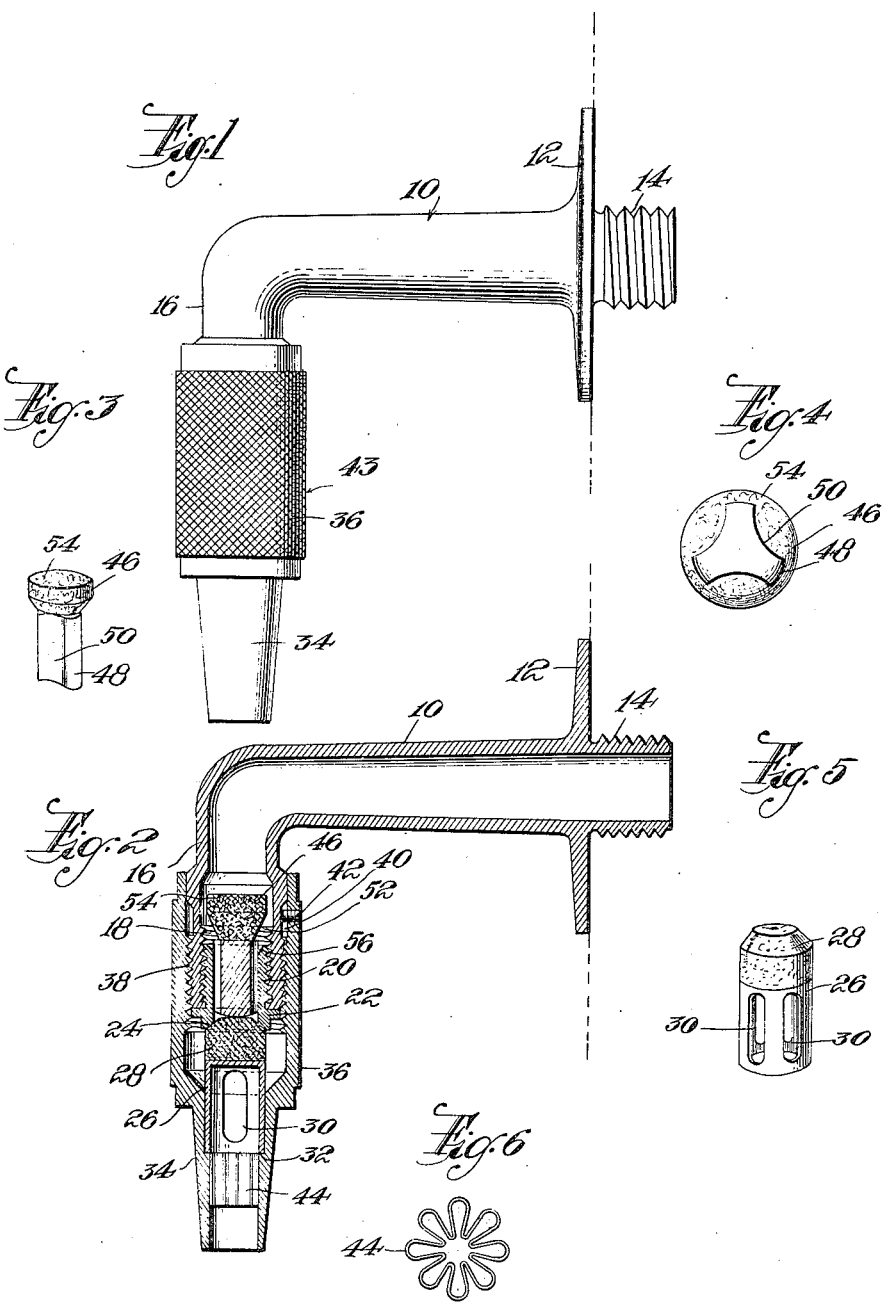
INVENTOR
Lambert Schmidt
BY C. P. Toepel
ATTORNEY Patented Oct. 21, 1924.

1,512,806

UNITED STATES PATENT OFFICE.

LAMBERT SCHMIDT, OF BROOKLYN, NEW YORK.

FAUCET.

Application filed December 31, 1921. Serial No. 526,248.

*To all whom it may concern:*

Be it known that I, LAMBERT SCHMIDT, a citizen of the United States, and resident of the borough of Brooklyn, county of Kings, city and State of New York, have invented certain new and useful Improvements in Faucets, of which the following is a specification.

This invention relates to faucets, and an object of the invention is to improve the operation and devices of such type.

In the use of faucets as heretofore constructed, it sometimes happens that the valve mechanism of a faucet is accidentally broken, or is otherwise rendered incapable of performing its intended function. In such cases great damage is often caused by the emission of fluid from the piping with which the faucet is connected. Even ir cases where no great damage results, for example, in the case of accident to a faucet connected with the water supply system of a dwelling house, it is necessary in order to prevent the discharge of water from the faucet to shut off the flow of water to the entire supply system until the faucet can be repaired or replaced by a good one. Even when a broken faucet can be quickly repaired or replaced, the enforced shutting off of the water or other fluid to the piping with which the faucet is connected may be the cause of great inconvenience or loss. It frequently happens, however, that a broken faucet cannot be quickly repaired or replaced and in such an event the loss or inconvenience resulting from the faucet being put out of commission is greatly aggravated.

It is an object of this invention to produce a faucet which will avoid the above stated and other objections to faucets heretofore constructed and which in the event that the main valve mechanism of the faucet is broken or otherwise rendered inoperative will prevent the discharge of fluid from the associated piping.

To this end, an important feature of the invention resides in the provision of a faucet including a main valve mechanism having combined therewith means for automatically preventing the discharge of fluid from the associated piping in case the main valve mechanism is accidentally broken or otherwise rendered incapable of functioning. The preferred embodiment of the invention comprises a lower valve seat with which the main valve mechanism co-acts and an upper valve seat with which a valve element loosely supported on the main valve is adapted to engage in case of accident to the main valve.

Although the invention will be hereinafter described as applied to faucets, it is recognized that the invention is applicable to fluid controlling mechanism of other forms. It is intended therefore, that the scope of the invention shall be limited only as required by the claims.

Other objects and features of the invention will appear as the description provided and will be pointed out in the appended claims.

In the drawings, Figure 1 is a view in side elevation of a faucet constructed in accordance with the invention;

Figure 2 is a view of the faucet in longitudinal section;

Figure 3 illustrates the auxiliary valve element;

Figure 4 is a view of the valve element looking from the bottom in Figure 3;

Figure 5 shows the main valve, and

Figure 6 is a view of a distributing device mounted in the nozzle of the faucet.

The illustrated construction comprises a tube or pipe 10 provided with the usual flange 12 and being threaded exteriorly at 14 for attachment to a system of piping. As shown, the tube 10 is bent downwardly at 16 and is threaded on its interior as indicated at 18 for engagement with corresponding threads on a sleeve member 20 screwed into the lower end of the downwardly turned portion 16 of the tube. The sleeve member 20 is provided at its lower end with a flange portion 22 formed to provide a valve seat 24 to co-act with a valve 26. The valve 26 is the main valve of the faucet and is formed at its upper end with a fibre block 28 the upper surface of which is bevelled so as to enable it tightly to engage the valve seat 24 of the sleeve member 20. As shown, the lower portion of the valve 26 consists of a cylindrical metal thimble having its closed end at its top and connected with the fibre block 28. The valve 26 is provided in its sides with elongated ports 30 which permit flow of fluid through the faucet when the valve 26 is in open position. The valve 26 is supported on a shoulder 32 formed in the nozzle portion 34 of a tubular member 36 which is mounted for vertical movement on the exterior of the downwardly turned portion 16 of the tube 10. Devices of various forms may be provided for effecting upward and downward movement of the tubular member 36 on the tube 10. In the illustrated construction, however, I have formed the downwardly turned portion 16 of the tube 10 on its exterior surface with screw threads 38 for engagement with similar screw threads on the interior of the tubular member 36. The downwardly turned portion 16 of the tube 10 is also formed on its exterior surface above the screw threads 38 with an annular groove 40, and the tubular member 36 has mounted therein a pin 42 extending into the annular groove 40 of the tube 10. In order to facilitate rotation of the tubular member 36, it is preferably formed with a milled outer surface 43. With this construction when the tubular member 36 is screwed upwardly on the tube 10, it causes the valve 26 to be moved to closed position, the upward movement of the valve, however, being limited by the engagement of the pin 42 with the upper wall of the annular groove 40, thus preventing the tubular member 36 from being screwed upwardly to an extent such as to impose undue pressure on the fibre block 28 of the valve 26. Upon rotation of the tubular member 36 in the opposite direction, the valve 26 is opened, the opening movement of the valve being limited by the engagement of the stop pin 42 with the shoulder formed on the upper screw thread of the series of threads 38 on the exterior surface of the tube 10.

In order to cause the water or other fluid as it issues from the faucet to be distributed uniformly throughout the area of the nozzle 34 of the faucet, a corrugated distributing member 44 of the shape shown in Figure 6 is preferably inserted into the nozzle 34 below the valve supporting shoulder 32.

A simple embodiment of means for preventing the escape of fluid from the faucet in case the valve 26 is broken or otherwise rendered functionless comprises an auxiliary valve element 46 having a substantially cylindrical portion 48 received loosely in the sleeve member 20 and rounded at its lower end where it rests by gravity upon the fibre block 28 of the main valve 26. In order to allow flow of fluid through the sleeve 20, the cylindrical portion 48 of the valve element 46 is provided with longitudinally extending grooves 50. It will also be noted that the arrangement of the grooves 50 and of the ports 30 in the main valve 26 is such as to tend to effect uniform distribution of the fluid throughout the area of the mouth of the nozzle 34 as the fluid issues from the faucet. The valve element 46 is constructed above the cylindrical portion 48 with a frusto-conical portion 52 and an upper cylindrical portion 54, the frusto-conical portion 52 being adapted to co-act with a valve seat 56 at the upper end of the sleeve member 20. Portions 52 and 54 of the valve element 46 are preferably formed from fibre to insure a tight engagement between them and the valve seat 56, and the lower cylindrical portion 48 of the valve element is suitably attached thereto.

It will be apparent from the foregoing that if the valve 26 is broken as, for example, by the separation of the fire block 28 from the metal thimble below it, the valve element 46 will drop by gravity upon the seat 56 of the sleeve member 20, thereby preventing the discharge of fluid from the piping with which the faucet is connected. In the event that repairs are needed or if it is desirable for other reasons to disconnect the tubular member 36 from the faucet, this may be readily accomplished by first removing the screw pin 42 and then turning the tubular member off from tube 10. The main valve 26 in such case would be removed from the faucet along with the tubular member 36 and the needed repairs to that valve might be made at leisure and without shutting off the supply of fluid to the main pipe, because the pressure of the fluid in the piping would force the auxiliary valve element 46 closely into engagement with the seat 56 of the sleeve 20, and all possibility of the escape of fluid would thereby be obviated.

A further advantage of my improved faucet is that no soft washers, such, for example, as the leather washers with which faucets are usually equipped, are required in my construction. Moreover, the arrangement of the valve 26 and the tubular operating member 36 absolutely prevents leakage and enables anyone by the slightest pressure to shut off the water.

Having fully described my invention, what is claimed is:

1. In combination with a water supply pipe having an interiorly and exteriorly threaded end, a faucet comprising a tubular member engaged with the exterior threads for lingitudinal adjustment thereon, a sleeve detachably engaged with the interior threads of the supply pipe and provided at each end of its bore with a valve seat, a primary valve member carried by said tubular member and engaged with or disengaged from the valve seat on one end of said sleeve by the adjustment of the tubular member, and a secondary valve member extending through said sleeve and resting by gravity upon the primary valve member and having a part permitting passage of water through said sleeve and guided in its movement by the wall of said sleeve, and a second part adapted for engagement upon the valve seat at the other end of said sleeve to prevent the discharge of water when said tubular member is disconnected from said pipe.

2. In a faucet, a sleeve member formed to provide seats at its upper and lower ends, a valve co-acting with the lower valve seat for controlling the flow of fluid from the faucet, and an auxiliary valve element having a grooved stem snugly fitting the bore of said sleeve loosely supported on the valve and co-acting with the upper valve seat to prevent discharge of fluid from the faucet in case of accident to the lower valve.

3. In a faucet, a tube, a sleeve member threaded into the end of the tube and having a flanged portion adapted to engage the end of the tube and provided with a valve seat, the valve co-acting with said seat, means for opening and closing said valve comprising a tubular member threaded exteriorly on the tube, and a valve element loosely supported on said valve and co-acting with the upper end of the sleeve member to automatically prevent the discharge of fluid from the faucet in case of accident to the valve.

In testimony that I claim the foregoing as my invention, I have signed my name hereunder.

LAMBERT SCHMIDT.

Witness:
JOHN H. FOLLMER.